(12) United States Patent
Takeshima

(10) Patent No.: US 11,637,485 B2
(45) Date of Patent: Apr. 25, 2023

(54) METHOD OF MANUFACTURING ROTOR IN WHICH MAGNET IS INSERTED INTO MAGNET HOLE OF ROTOR CORE

(71) Applicant: TOYOTA JIDOSHA KABUSHIKI KAISHA, Toyota (JP)

(72) Inventor: Kenta Takeshima, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/302,724

(22) Filed: May 11, 2021

(65) Prior Publication Data
US 2021/0391776 A1    Dec. 16, 2021

(30) Foreign Application Priority Data

Jun. 11, 2020   (JP) .............................. JP2020-101622

(51) Int. Cl.
*H02K 15/03* (2006.01)
*H02K 1/276* (2022.01)

(52) U.S. Cl.
CPC ............. *H02K 15/03* (2013.01); *H02K 1/276* (2013.01); *Y10T 29/49009* (2015.01)

(58) Field of Classification Search
CPC ...... H02K 15/03; H02K 1/2706; H02K 1/276; Y10T 29/49826; Y10T 29/49012; Y10T 29/49009; F05B 2220/7068; F16C 2380/26; F16C 39/063

USPC ................... 29/596, 598, 604, 607, 729, 732
See application file for complete search history.

(56) References Cited

U.S. PATENT DOCUMENTS 9,819,250 B2 * 11/2017 Hasegawa .............. H02K 15/03
2017/0040875 A1    2/2017 Kino et al.

FOREIGN PATENT DOCUMENTS

| JP | H09163649 | * 12/1995 |
|----|-----------|-----------|
| JP | 2008148364 A | 6/2008 |
| JP | 2014222964 A | 11/2014 |
| JP | 2017046411 A | 3/2017 |
| JP | 6369420 B2 | 8/2018 |
| JP | 6546486 B2 | 7/2019 |

* cited by examiner

*Primary Examiner* — Thiem D Phan
(74) *Attorney, Agent, or Firm* — Hunton Andrews Kurth LLP

(57) ABSTRACT

A method of manufacturing a rotor is disclosed. A magnet is inserted into a magnet hole of a rotor core. The method comprises inserting an insertion member into the magnet hole having a first opening and a second opening. The method comprises fixing the magnet to the insertion member extending out from the second opening. The method comprises inserting the magnet, which is fixed to the insertion member, into the magnet hole from the second opening by pulling the insertion member extending out from the first opening in a direction separating away from the rotor core. The method comprises cutting the insertion member extending out from the first opening.

3 Claims, 13 Drawing Sheets

FIG. 2
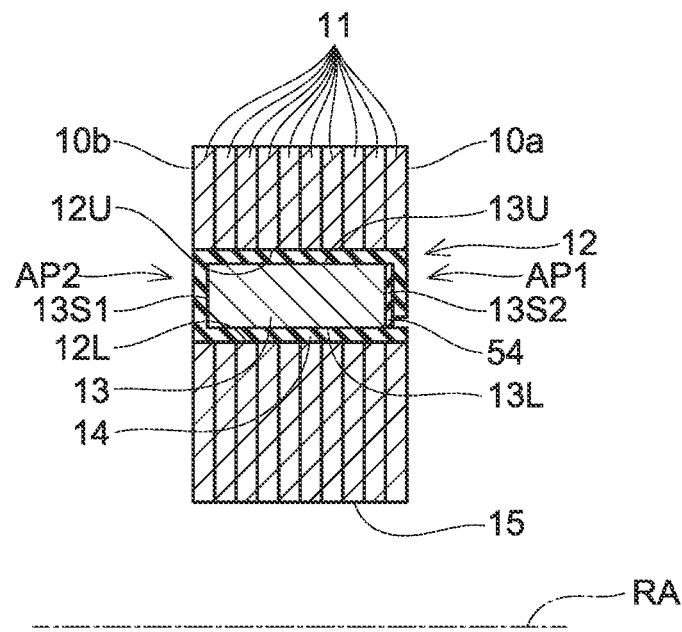
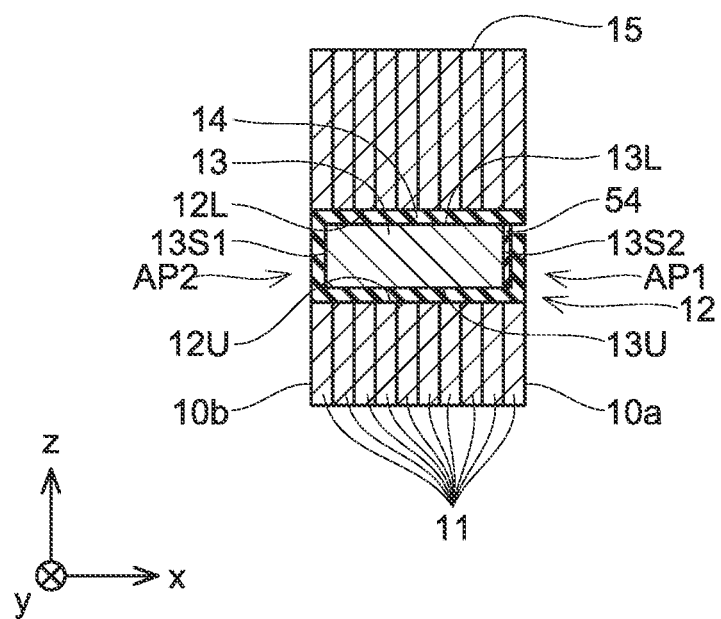

METHOD OF MANUFACTURING ROTOR IN WHICH MAGNET IS INSERTED INTO MAGNET HOLE OF ROTOR CORE

CROSS-REFERENCE TO RELATED APPLICATION

This application claims priority to Japanese patent application No. 2020-101622, filed on Jun. 11, 2020, the entire contents of which are incorporated herein by reference.

TECHNICAL FIELD

The description herein discloses a rotor manufacturing method and a rotor manufacturing device.

BACKGROUND

JP 2014-222964 A describes a rotor manufacturing method in which a magnet is inserted into a magnet hole of a rotor core. Specifically, the magnet is pressed into the magnet hole while winding a sheet-like or string-like insertion member thereon.

SUMMARY

When the magnet is pressed into the magnet hole, the insertion member may be caught on an inner wall due to friction between the inner wall of the magnet hole and the insertion member. With the manufacturing method of JP 2014-222964 A, there is a case where the magnet is further pressed in despite the insertion member being caught as above. As a result, a damage may be caused on the insertion member.

The technique disclosed herein is embodied as a method of manufacturing a rotor in which a magnet is inserted into a magnet hole of a rotor core. The method comprises inserting an insertion member into the magnet hole having a first opening and a second opening. The method comprises fixing the magnet to the insertion member extending out from the second opening. The method comprises inserting the magnet, which is fixed to the insertion member, into the magnet hole from the second opening by pulling the insertion member extending out from the first opening in a direction separating away from the rotor core. The method comprises cutting the insertion member extending out from the first opening.

With this rotor manufacturing method, the magnet and the insertion member are inserted into the magnet hole by pulling the insertion member fixed to the magnet. By applying force to the magnet via the insertion member rather than directly applying force onto the magnet, integral insertion of the insertion member and the magnet can be ensured. As such, during insertion, if the insertion member stops moving due to being caught on an inner wall of the magnet hole, movement of the magnet can also be stopped. A situation in which only the magnet is further pressed in while the insertion member is caught does not occur, thus a damage to the insertion member can be suppressed from occurring.

The technique disclosed herein is embodied as a rotor manufacturing device. The device comprises a rotor core fixing unit configured to fix a rotor core. The device comprises an insertion member inserting unit configured to insert an insertion member into a magnet hole provided in the rotor core. The magnet hole has a first opening and a second opening. The device comprises a magnet fixing unit configured to fix a magnet to the insertion member extending out from the second opening. The device comprises a magnet insertion unit configured to insert the magnet, which is fixed to the insertion member, into) the magnet hole from the second opening by pulling the insertion member extending out from the first opening in a direction separating away from the rotor core. The device comprises a cutting unit configured to cut the insertion member extending out from the first opening. According to this, the situation in which only the magnet is further pressed in while the insertion member is caught does not occur, thus a damage to the insertion member can be suppressed from occurring.

BRIEF DESCRIPTION OF DRAWINGS

FIG. 2 shows a cross-sectional view along a line II-II of FIG. 1.

DETAILED DESCRIPTION

Figure 1:
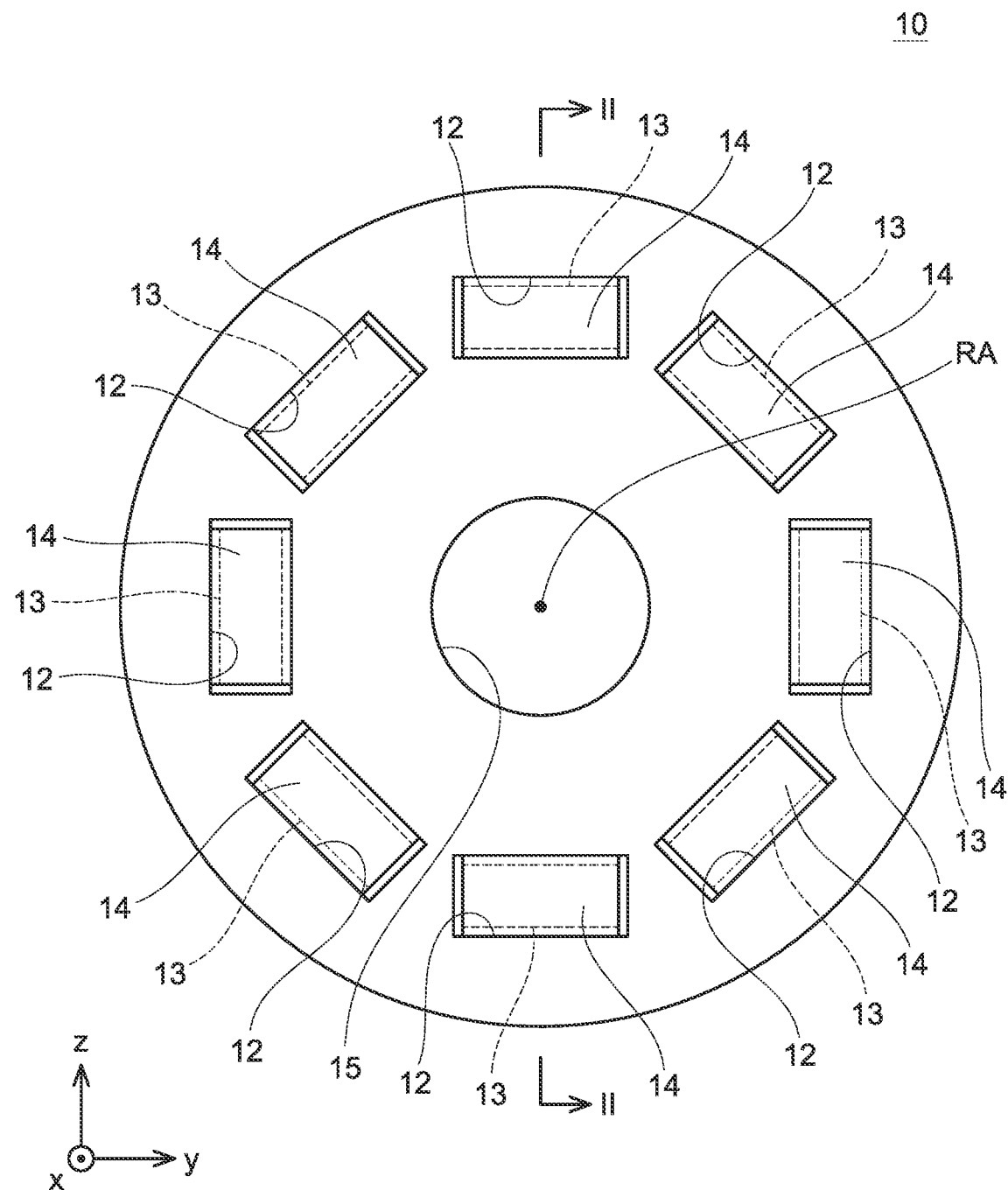
FIG. 1 shows a schematic plan view of a rotor core 10.

In one aspect of the present teachings, a central axis direction of the magnet hole may be angled with respect to a vertical direction. The magnet hole may include two inner wall surfaces facing each other, one of which may be a lower inner wall surface located on a lower side along the vertical direction. The inserting of the magnet may be executed in a state of having a lower surface of the magnet in contact with the lower inner wall surface via the insertion member. Due to this, the lower surface of the insertion member disposed on the lower surface of the magnet can be pressed against the lower inner wall surface by force of gravity. Positioning to match a position of the lower surface of the insertion member and a position of the lower inner wall surface can be performed by self-alignment.

In one aspect of the present teachings, a processing stage including a reference surface parallel to the lower inner wall surface may be disposed in a vicinity of the second opening. In the inserting of the insertion member, a state in which the insertion member is in contact with the reference surface as well as with the lower inner wall surface may be established. In the fixing, a state in which the lower surface of the magnet is in contact with the reference surface via the insertion member may be established. In the inserting of the magnet, the insertion member may be pulled by maintaining the state in which the insertion member is in contact with the lower inner wall surface. Due to this, the magnet can be inserted into the magnet hole in a state of having the position of the lower surface of the insertion member and the position of the lower inner wall surface positioned by self-alignment.

In one aspect of the present teachings, the magnet may have a shape of a substantially rectangular solid. The magnet may include the lower surface, an upper surface being a surface opposite to the lower surface, and a first side surface and a second side surface that are orthogonal to a central axis of the magnet hole. A distance between the first side surface and the magnet hole may be greater than a distance between the second side surface and the magnet hole. In the fixing, the insertion member may be fixed to the magnet so as to cover the upper surface, the first side surface, and the lower surface of the magnet. Due to this, a state in which the insertion member is in contact with both the reference surface and the lower inner wall surface can be established.

In one aspect of the present teachings, in the fixing, the insertion member may be adhered to at least a part of one or more of the upper surface, the first side surface, and the lower surface by adhesive. Due to this, the magnet can be fixed to the insertion member.

In one aspect of the present teachings, the rotor core fixing unit may be configured to fix the rotor core such that a central axis direction of the magnet hole is angled with respect to a vertical direction, and such that the magnet hole comes to include two inner wall surfaces facing each other, one of which is a lower inner wall surface located on a lower side along the vertical direction. The rotor manufacturing device may further comprise a processing stage disposed in a vicinity of the second opening and including a reference surface parallel to the lower inner wall surface. The insertion member inserting unit bay be configured to insert the insertion member so as to establish a state in which the insertion member is in contact with the reference surface as well as with the lower inner wall surface. The magnet fixing unit may be configured to fix the magnet to the insertion member so as to establish a state in which the lower surface of the magnet is in contact with the reference surface via the insertion member. The magnet inserting unit may be configured to pull the insertion member such that the insertion member is pulled in a state where the insertion member is in contact with the lower inner wall surface. Due to this, the magnet can be inserted into the magnet hole in the state of having the position of the lower surface of the insertion member and the position of the lower inner wall surface positioned by self-alignment.

In one aspect of the present teachings, the magnet may have a shape of a substantially rectangular solid. The magnet may include the lower surface, an upper surface being a surface opposite to the lower surface, and a first side surface and a second side surface that are orthogonal to a central axis of the magnet hole. A distance between the first side surface and the magnet hole may be greater than a distance between the second side surface and the magnet hole. The magnet fixing unit may be configured to fix the insertion member to the magnet such that the insertion member covers the upper surface, the first side surface, and the lower surface of the magnet. Due to this, the state in which the insertion member is in contact with both the reference surface and the lower inner wall surface can be established.

In one aspect of the present teachings, the magnet fixing unit may be configured to adhere the insertion member to at least a part of one or more of the upper surface, the first side surface, and the lower surface by adhesive. Due to this, the magnet can be fixed to the insertion member.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved methods and devices for manufacturing a rotor core.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS (Structure of Rotor)

FIG. 1 shows a schematic plan view of a rotor core 10. FIG. 2 shows a cross-sectional view along a line II-II of FIG. 1. The rotor core 10 is provided with magnet holes 12, magnets 13, sheets 14, and a shaft hole 15. The shaft hole 15 is a portion where a shaft that is not shown is to be attached. The rotor core 10 is a member configured to rotate about a rotary axis RA. As shown in FIG. 2, the rotor core 10 is configured by laminating a plurality of electromagnetic steel plates 11 along a rotary axis RA direction. The rotor core 10 has a first surface 10a on a +x direction side and a second surface 10b on a −x direction side.

The magnet holes 12 are spaces into which the magnets 13 are inserted. The magnet holes 12 are arranged in plurality with a regular interval in between them in a circumferential direction with the rotary axis RA as a center. The magnet holes 12 each have a substantially rectangular shape when seen in a plan view along a x axis direction (FIG. 1). The magnet holes 12 penetrate the rotor core 10 along the x direction. The magnet holes 12 each have a first opening AP1 in the first surface 10a and a second opening AP2 in the second surface 10b. The magnet holes 12 each include an upper inner wall surface 12U and a lower inner wall surface 12L. Of these two inner wall surfaces facing each other in each magnet hole 12, the upper inner wall surface 12U is an inner wall surface closer to an outer circumference of the rotor core 10. The lower inner wall surface 12L of the two inner wall surfaces is an inner wall surface closer to the rotary axis RA.

The lower inner wall surfaces 12L and the upper inner wall surfaces 12U have large frictional coefficients. This is because, since the rotor core 10 is manufactured by pressing and laminating the electromagnetic steel plates 11, there is surface roughness between those plates. As such, it is preferable to remove burrs from end surfaces of the plurality of electromagnetic steel plates 11 exposed on the upper inner wall surfaces 12U and the lower inner wall surfaces 12L. Further, it is preferable that a protruding direction of the burrs is in a same direction as an inserting direction (+x direction) in a magnet inserting step (S60) to be described later.

The magnets 13 are permanent magnets. The magnets 13 each have a shape of a substantially rectangular solid. As shown in FIG. 2, each magnet 13 is housed in its corresponding one of the plurality of magnet holes 12 in a state of having the sheet 14 wound thereon. The magnets 13 each have a lower surface 13L, an upper surface 13U, a first side surface 13S1, and a second side surface 13S2. The lower surface 13L is a surface that faces the lower inner wall surface 12L when the magnet 13 is housed in its corresponding magnet hole 12. The upper surface 13U is a surface on an opposite side from the lower surface 13L. The first side surface 13S1 is a surface located on a second opening AP2 side when the magnet 13 is housed in its corresponding magnet hole 12. The second side surface 13S2 is a surface on an opposite side from the first side surface 13S1. The second side surface 13S2 is adhered to its corresponding sheet 14 by adhesive 54.

The sheets 14 are each an insertion member disposed between the inner wall surfaces of the magnet hole 12 and the magnet 13. The sheets 14 are preferably insulators to avoid worsening of core loss caused by electric conduction with the rotor core 10. Further, the sheets 14 preferably have heat resistance. Further, in order to reduce insertion resistance in a sheet inserting step (S20) and in the magnet inserting step (S60) to be described later, the sheets 14 preferably have a small frictional coefficient. The sheets 14 have a property of foaming (expanding) by being heated or undergoing a chemical change. The sheets 14 may for example be thermoplastic resin sheets containing heat-foaming capsules. The sheets 14 may be thermo-curing resin or may contain fillers such as glass fiber. As will be described later, the magnets 13 are inserted into the magnet holes 12 in a state where the magnets 13 are covered by the sheets 14 which have not yet foamed. After this, by foaming the sheets 14, frictional force can be generated between inner walls of the magnet holes 12 and the magnets 13. The magnets 13 can be ensured to be held within the magnet holes 12.

(Configuration of Rotor Manufacturing Device 1)

Figure 3:
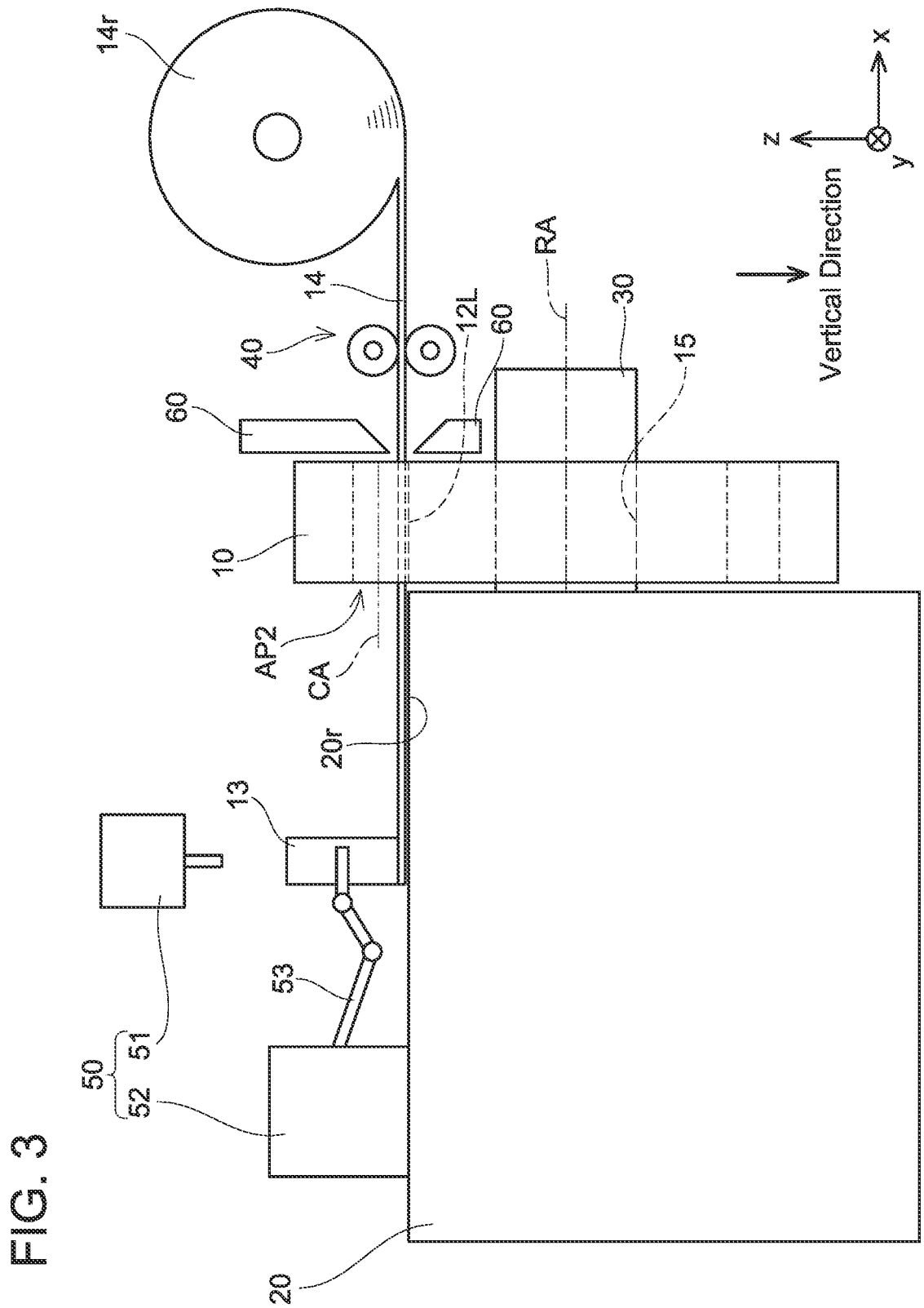
FIG. 3 shows a schematic side view of a rotor manufacturing device 1.

FIG. 3 shows a schematic side view of the rotor manufacturing device 1. In FIG. 3, a state in which the rotor core 10, one magnet 13, and an extended sheet that is to be the sheets 14 are placed in the rotor manufacturing device 1 is shown. The rotor manufacturing device 1 is provided with a processing stage 20, a fixing shaft 30, a sheet moving mechanism 40, a fixed mechanism 50, and a cutter 60.

The fixing shaft 30 is a member configured to fix the rotor core 10 on the processing stage 20. The fixing shaft 30 is inserted into the shaft hole 15 of the rotor core 10. The fixing shaft 30 fixes the rotor core 10 such that the rotor core 10 is rotatable about the rotary axis RA. Further, the fixing shaft 30 fixes the rotor core 10 such that a central axis CA of each magnet hole 12 is angled with respect to a vertical direction (−z direction). In the present embodiment, the central axes CA are orthogonal to the vertical direction. That is, the lower inner wall surfaces 12L and a reference surface 20r are horizontal surfaces.

The processing stage 20 is provided with the reference surface 20r. In a state of having the rotor core 10 fixed to the fixing shaft 30, the reference surface 20r is located close to one of the second openings AP2. Further, the reference surface 20r is a surface substantially parallel to closest one of the lower inner wall surfaces 12L. In the present embodiment, a case will be described in which one lower inner wall surface 12L and the reference surface 20r are located on a same plane.

The sheet moving mechanism 40 is a mechanism configured capable of inserting a sheet 14 supplied from a sheet roll 14r into a magnet hole 12 and pulling out the same from the magnet hole 12. In the present embodiment, the sheet moving mechanism 40 is provided with a pair of roller structures configured to hold the sheets 14 in between.

The fixed mechanism 50 is a mechanism configured to fix a magnet 13 to the sheet 14 extending out from the second opening AP2 in the −x direction. The fixed mechanism 50 is provided with an adhesive supplying mechanism 51 and a robot 52. The adhesive supplying mechanism 51 is a mechanism configured to apply adhesive in a region on a surface of the sheet 14 where the magnet 13 is to be set. The robot 52 is provided with an arm 53. The robot 52 is configured to perform operations to arrange the magnet 13 at an initial position shown in FIG. 3 and rotating the magnet 13. The cutter 60 is a mechanism configured to cut the sheet 14 extending out from the first opening AP1 in the +x direction.

(Operation)

Figure 4:
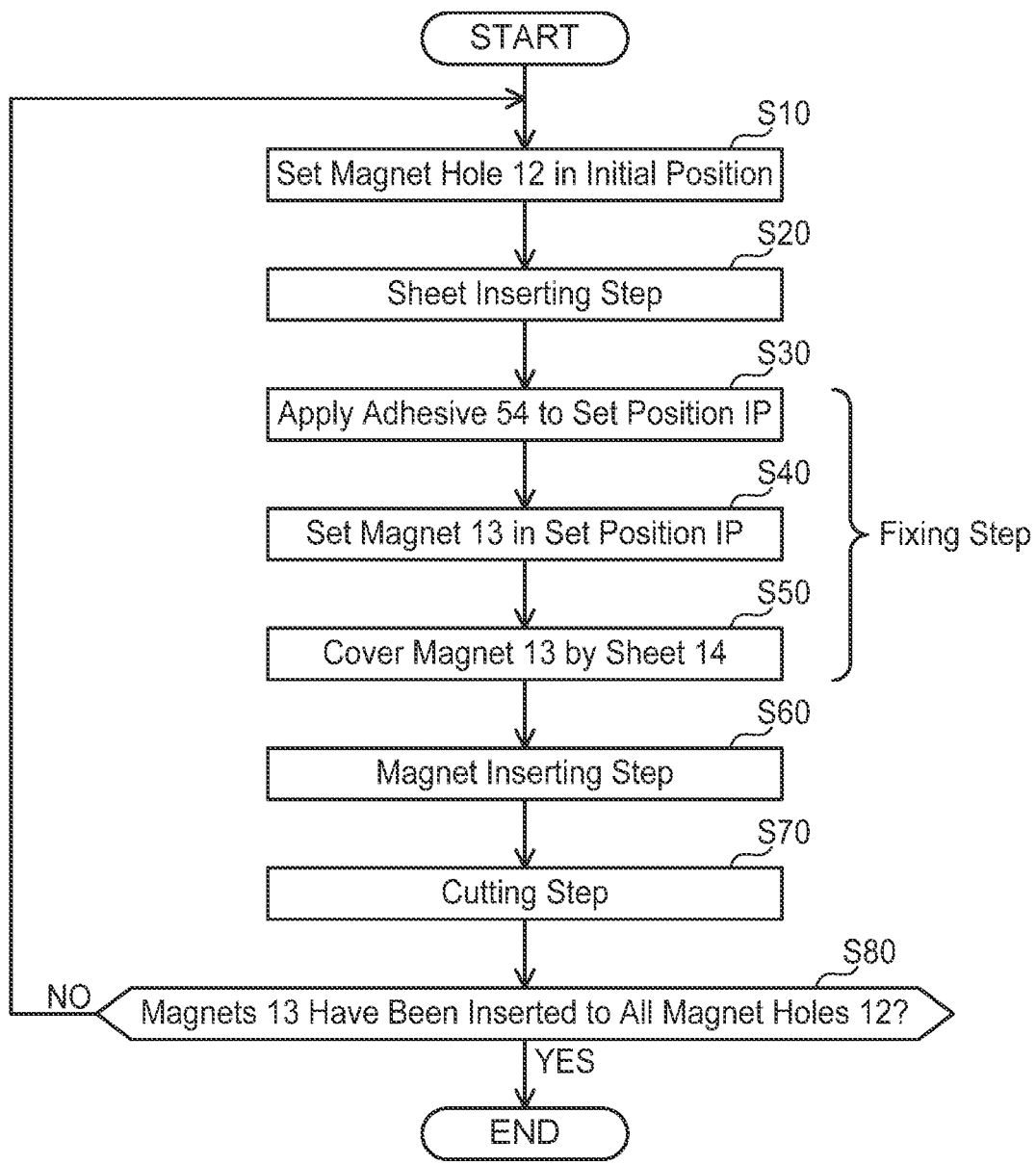
FIG. 4 is a flowchart explaining an operation of the rotor manufacturing device 1.

An operation of the rotor manufacturing device 1 will be described by using a flowchart of FIG. 4 and partially enlarged views of FIGS. 5 to 10. FIGS. 5 to 10 show a state in which the rotor core 10 is set in the rotor manufacturing device 1. Further, FIGS. 5 to 10 are cross-sectional views in a same cross section as FIG. 2. Hereinbelow, steps such as a "step 10" will be denoted as "S10".

In S10, one of the magnet holes 12 in which the magnet 13 has not yet been inserted is set in the initial position. The initial position is a position at which the lower inner wall surface 12L of this magnet hole 12 becomes parallel to the reference surface 20r. For example, the magnet hole 12 in which the magnet 13 has not yet been inserted may be set in the initial position by rotating the rotor core 10 by the fixing shaft 30.

Figure 5:
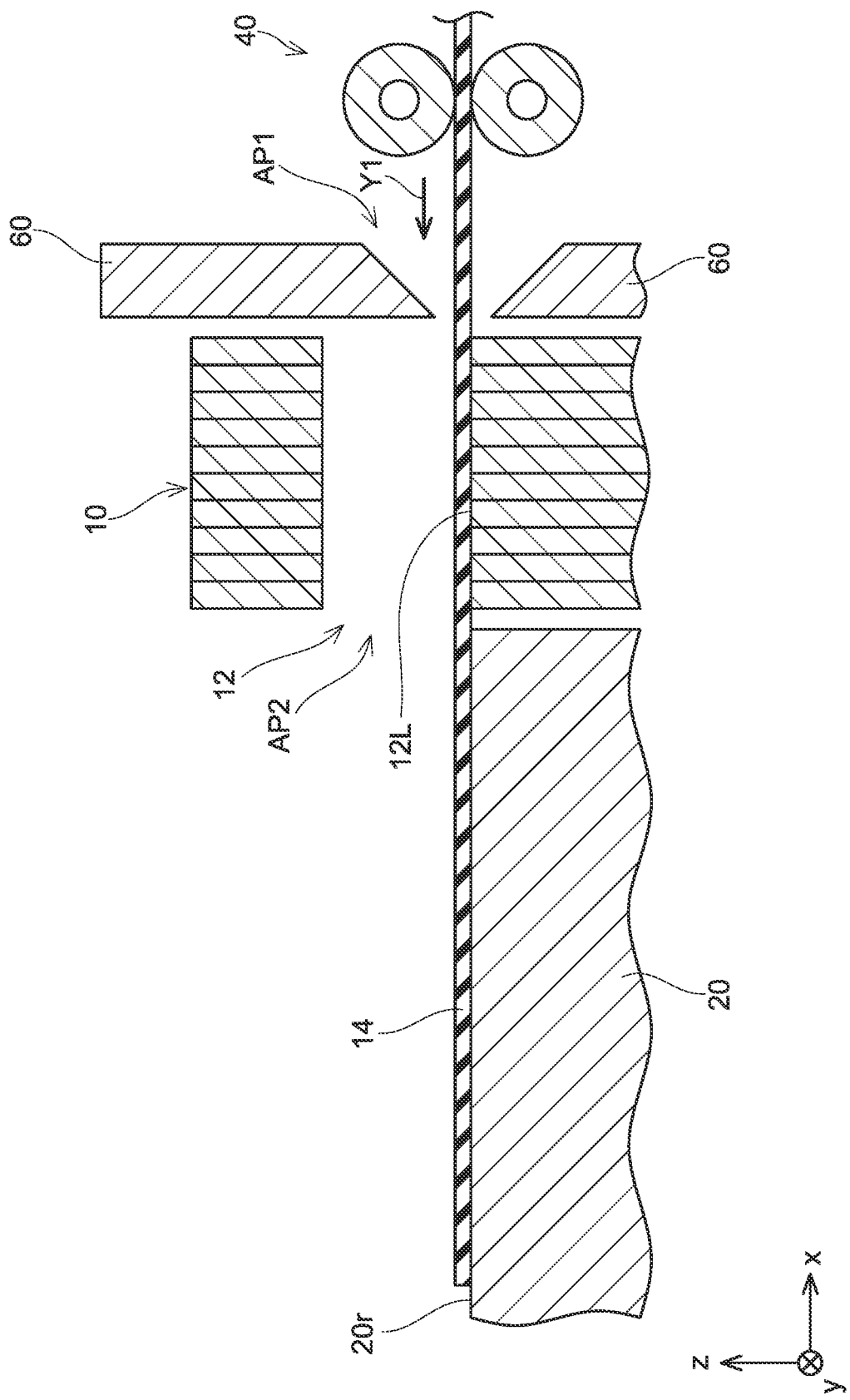
FIG. 5 is a partially enlarged view for explaining the operation of the rotor manufacturing device 1.
Figure 6:
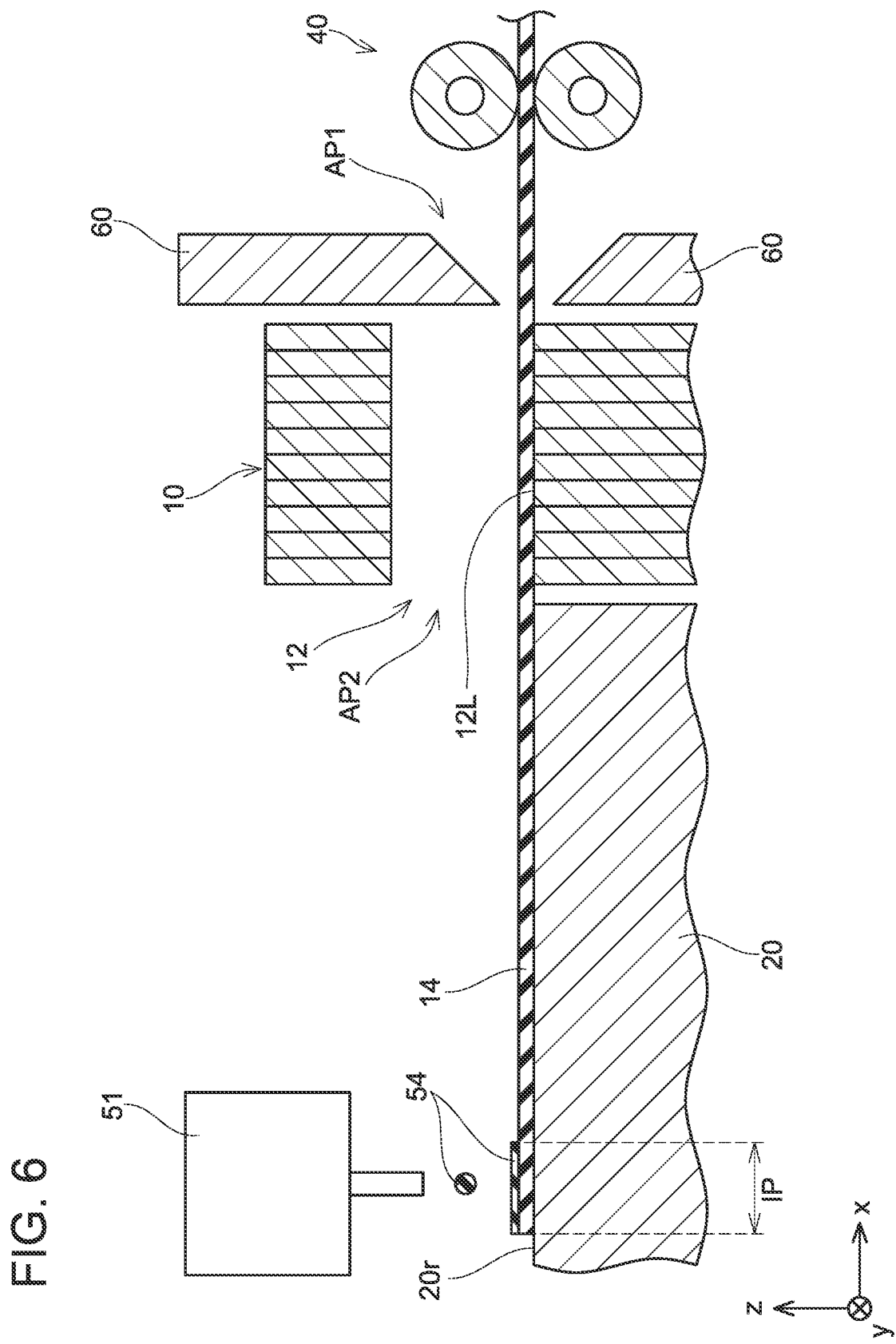
FIG. 6 is a partially enlarged view for explaining the operation of the rotor manufacturing device 1.

In S20, the sheet inserting step is executed (see FIG. 5). The sheet 14 that has not yet foamed is inserted into the magnet hole 12 by the sheet moving mechanism 40. The sheet 14 is inserted in the −x direction from the first opening AP1 (arrow Y1). In the sheet inserting step, a state is established in which the sheet 14 is in contact with the reference surface 20r and also in contact with the lower inner wall surface 12L.

In S30 to S50, a fixing step of fixing the magnet 13 to the sheet 14 are executed. Detailed steps will be described. In S30, the adhesive 54 is applied onto the surface of the sheet 14 in a set position IP by using the adhesive supplying mechanism 51 (see FIG. 6).

Figure 7:
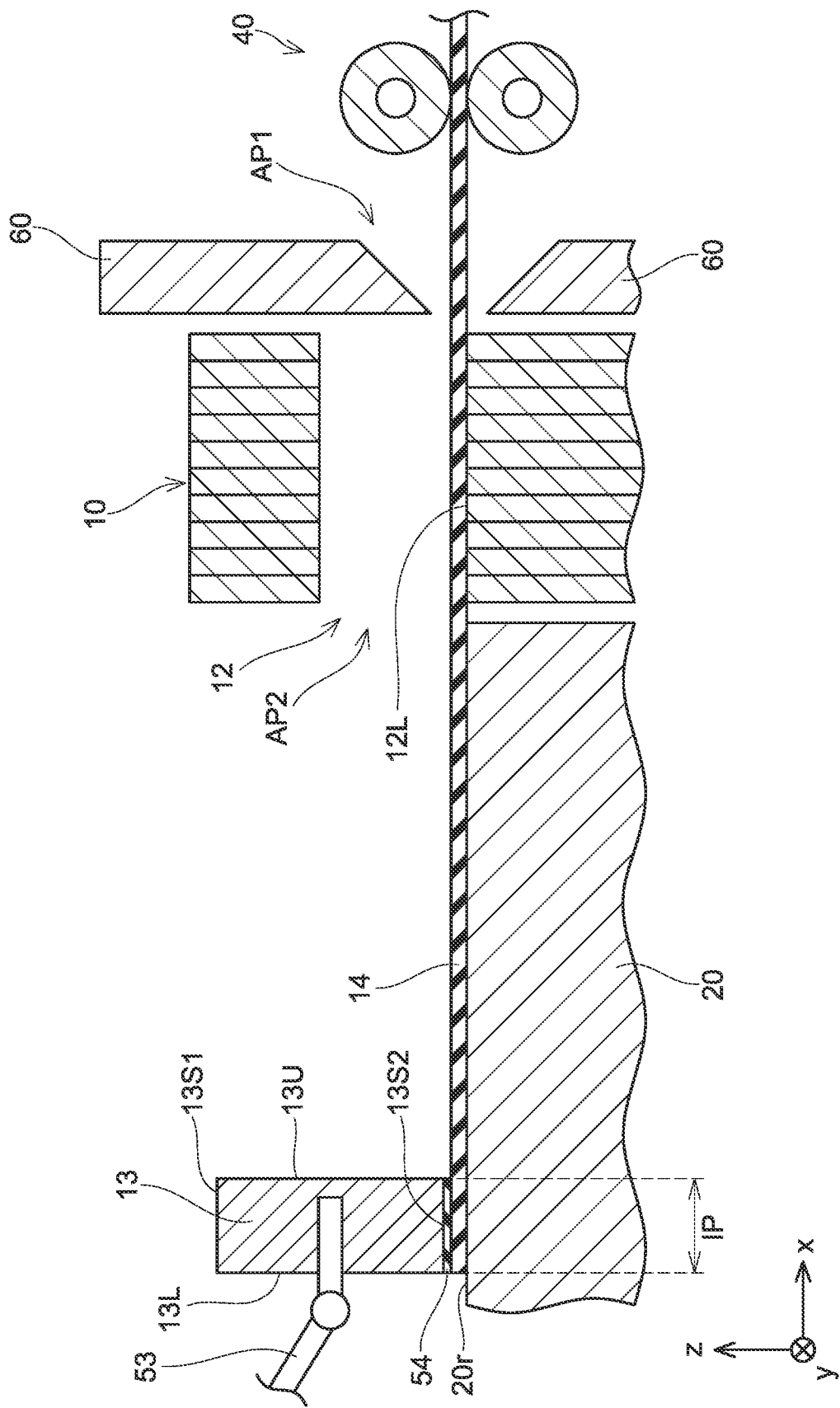
FIG. 7 is a partially enlarged view for explaining the operation of the rotor manufacturing device 1.

In S40, the magnet 13 is set in the set position IP (see FIG. 7). Specifically, the magnet 13 that was disposed in a storage location that is not shown is grabbed by the arm 53 and is conveyed to the set position IP. Then, the magnet 13 is disposed in the set position IP such that the second side surface 13S2 comes into contact with the adhesive 54 on the surface of the sheet 14. Due to this, the sheet 14 is fixed to the second side surface 13S2.

Figure 8:
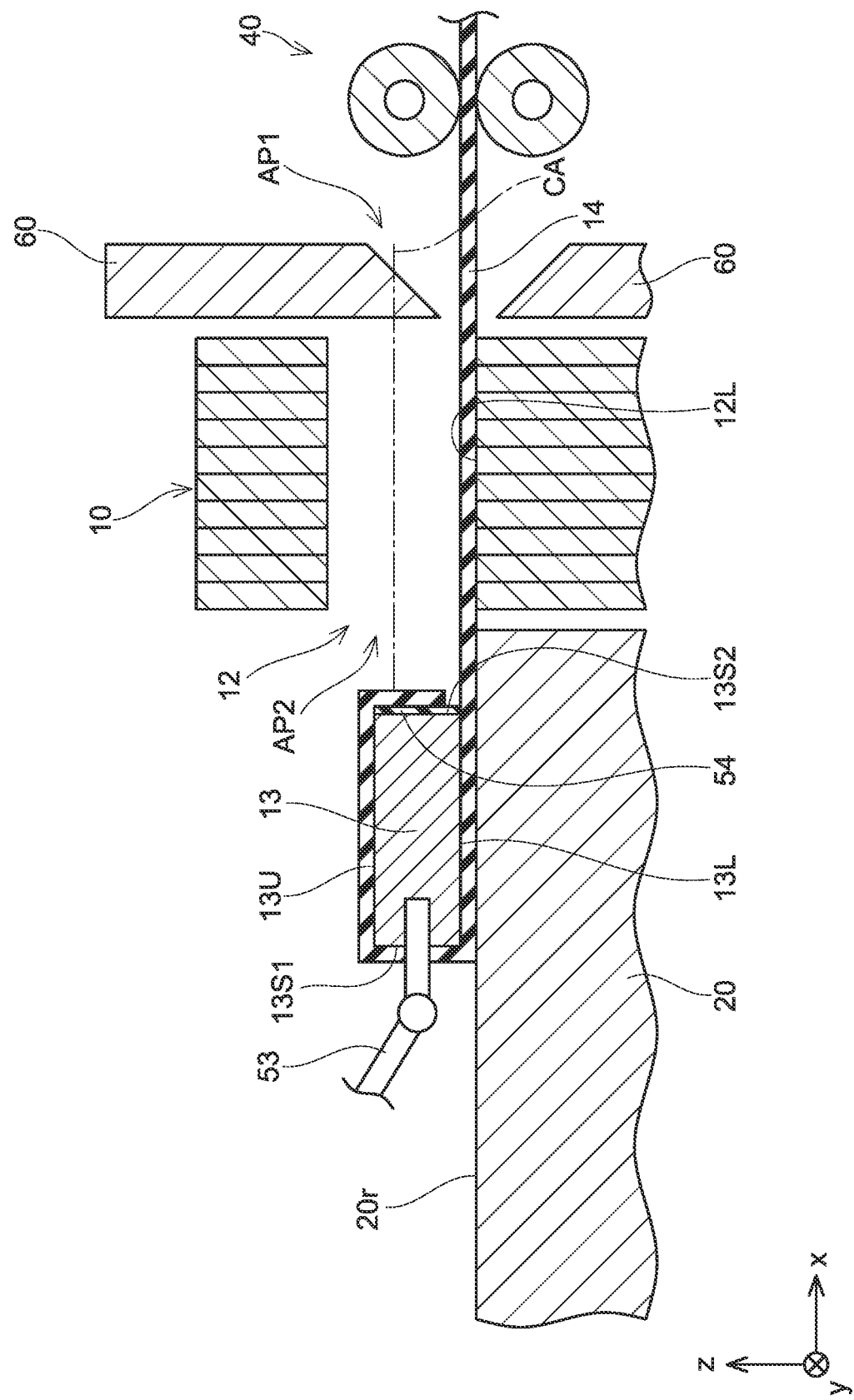
FIG. 8 is a partially enlarged view for explaining the operation of the rotor manufacturing device 1.

In S50, the magnet 13 is covered by the sheet 14 (see FIG. 8). Specifically, the magnet 13 is rotated by the arm 53 such that the magnet 13 moves in the +x direction. Due to this, the upper surface 13U, the list side surface 13S1, and the lower surface 13l are covered by the sheet 14 in this order.

When the fixing step of S30 to 450 is completed, a state in which the lower surface 13L of the magnet 13 is in contact with the reference surface 20r via the sheet 14 is established. Further, the first side surface 13S1 and the second side surface 13S2 are brought into a state of being orthogonal to the central axis CA of their corresponding magnet hole 12. The first side surface 13S1 is located at a position located further away from the magnet hole 12 as compared to the second side surface 13S2. That is, a distance between the first side surface 13S1 and the magnet hole 12 is greater than a distance between the second side surface 13S2 and the magnet hole 12.

Figure 9:
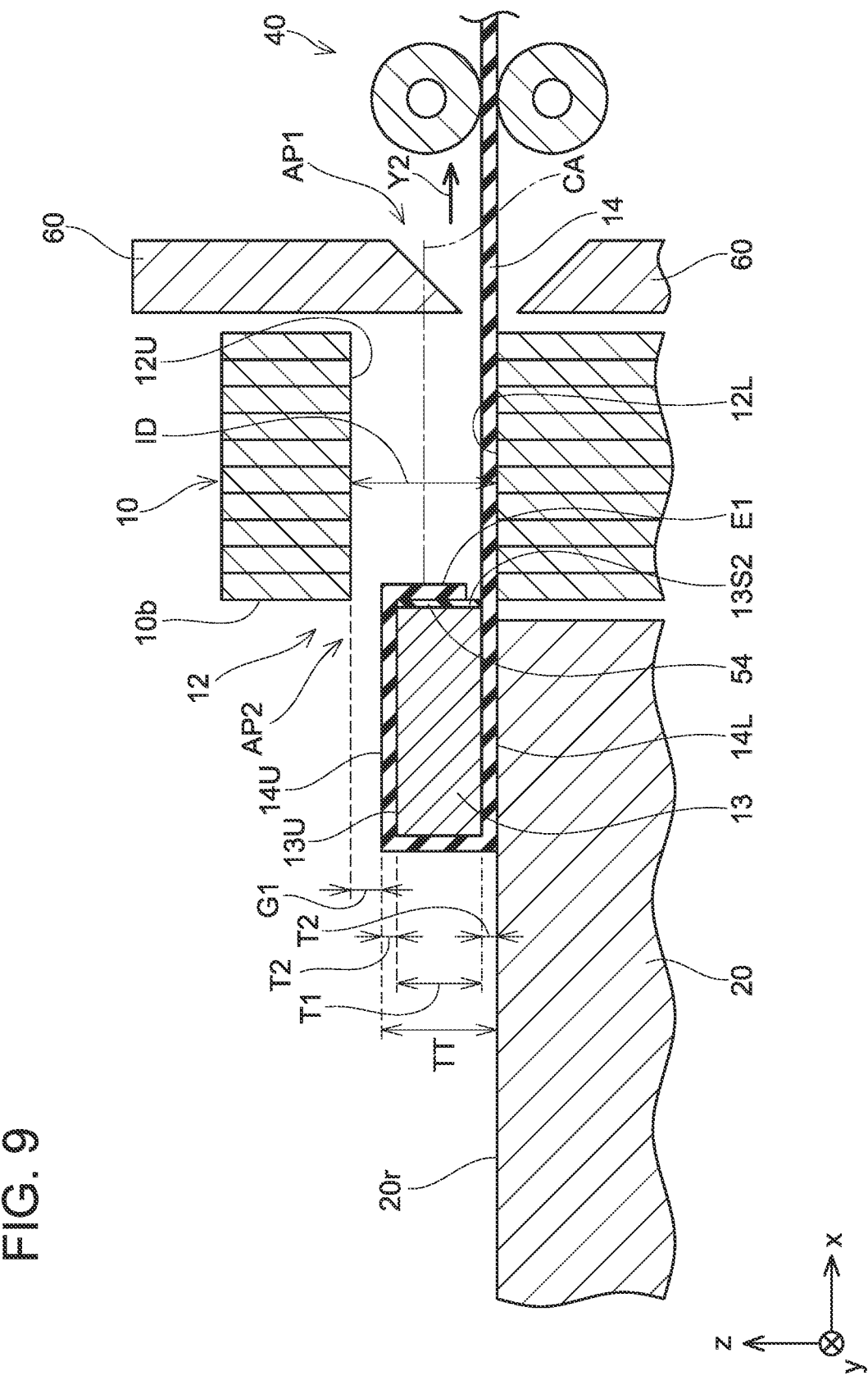
FIG. 9 is a partially enlarged view for explaining the operation of the rotor manufacturing; device 1.

In S60, the magnet inserting step of inserting the magnet 13 fixed to the sheet 14 into the magnet hole 12 (see FIG. 9). Specifically, the sheet 14 extending out from the first opening AP1 in the +x direction is pulled in a direction separating away from the rotor core 10 (+x direction) by the sheet moving mechanism 40. Due to this, the magnet 13 moves in a direction of an arrow Y2.

An upper surface of the sheet 14 disposed on the upper surface 13U of the magnet 13 will be termed an upper surface 14U. Further, a lower surface of the sheet 14 disposed on the lower surface 13L will be termed a lower surface 14L. When a distal end E1 of the magnet 13 enters the second opening AP2, positioning in a z direction must be executed so that the upper surface 14U is located lower (on a −z direction side) than the upper inner wall surface 12U and the lower surface 14L is located higher (on a +z direction side) than the lower inner wall surface 12L.

In the art of the present embodiment, the central axis CA of the magnet hole 12 is angled with respect to the vertical direction (−z direction). As such, the sheet 14 can be pulled while maintaining the state n which the sheet. 14 is in contact with the lower inner wall surface 12L by force of gravity. That is, the lower surface 14L of the sheet 14 disposed on the lower surface 13L can be pressed onto the lower inner wall surface 12L by the force of gravity. Due to this, positioning in the z direction by self-alignment can be performed so that the position of the lower surface 14L in the z direction and the position of the lower inner wall surface 12L in the z direction match. As a result, a gap G1 can be created between the upper surface 14U of the sheet 14 disposed on the upper surface 13U and the upper inner wall surface 12U of the magnet hole 12. With the gap G1 being created, the distal end E1 does not collide into the second surface 10b of the rotor core 10 upon when the distal end E1 enters into the second opening AP2.

Figure 10:
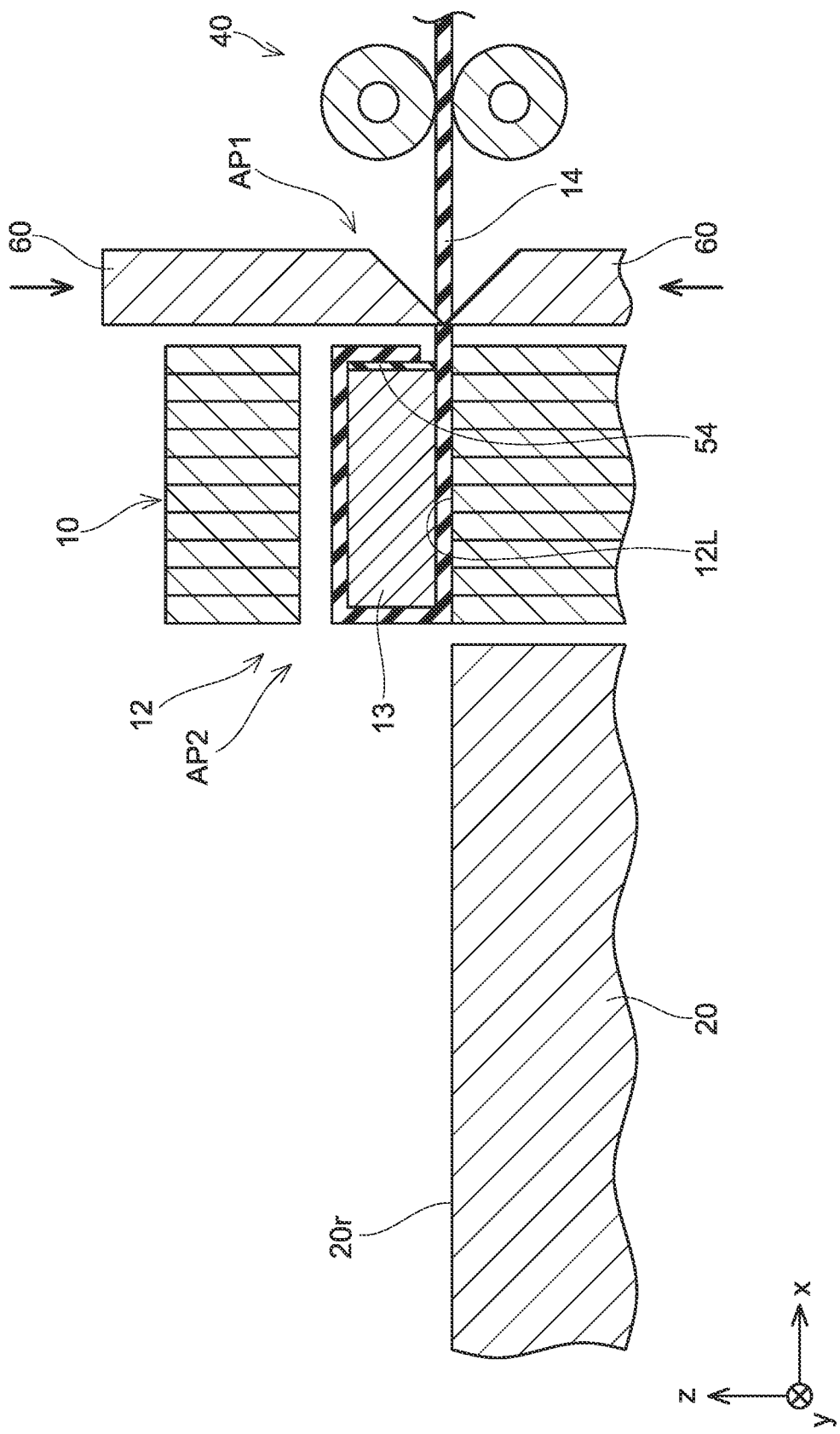
FIG. 10 is a partially enlarged view for explaining the operation of the rotor manufacturing device 1.

In S70, a cutting step of cutting the sheet 14 extending out from the first opening AP1 in the +x direction is executed (see FIG. 10). Cutting is performed by the cutter 60. In S80, a determination is made on whether or not the magnets 13 have been inserted into all the magnet holes 12 of the rotor core 10. In a case of a negative determination (S80: NO), the process returns to S10 and work for the subsequent magnet hole 12 is started. Since the sheet 14 that has been cut can be used without any modification in the subsequent sheet inserting step (S20), thus yield thereof is excellent. On the other hand, in a case of an affirmative determination (S80: YES), the process flow is terminated. After the process of FIG. 4 is terminated, the rotor core 10 is heated to cause the sheets 14 to foam. The sheets 14 thereby expand, as a result of which the magnets 13 are fixed in the magnet holes 12. A rotor having the magnets 13 fixed in the magnet holes 12 of the rotor core 10 is thereby completed.

(First Effect)

Figure 11:
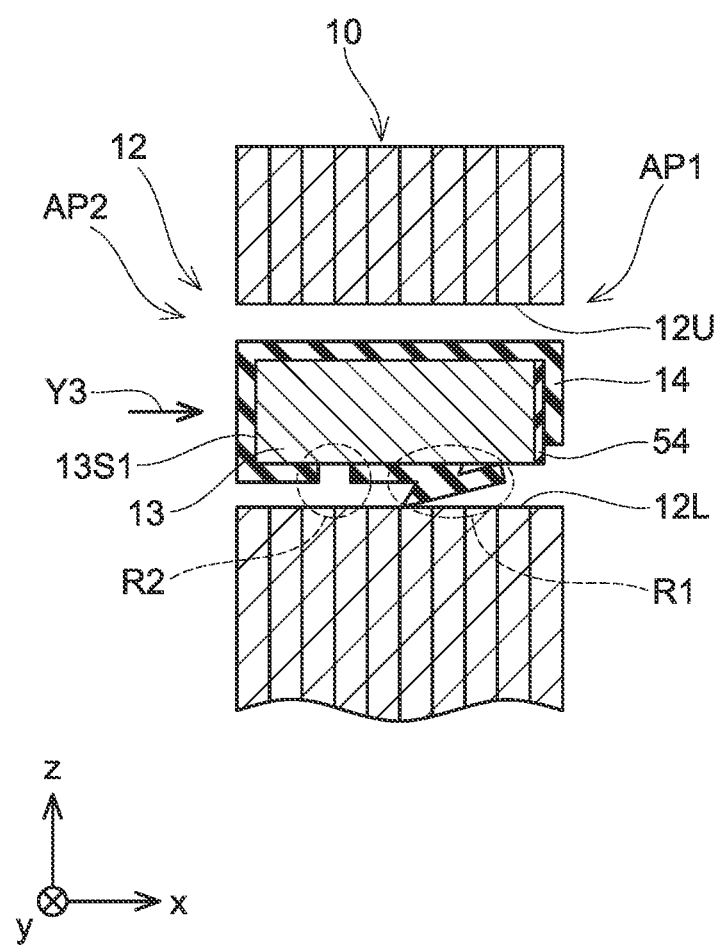
FIG. 11 is a diagram for explaining a problem aimed to be solved.

A problem aimed to be solved will be described. As shown in FIG. 11, a situation will be assumed in which the magnet 13 is inserted into the magnet hole 12 by pressing the first side surface 13S1 of the magnet 13 covered by the sheet 14 in a direction of an arrow Y3 (+x direction). Upon inserting the magnet 13, there is a case where the sheet 14 is caught by an inner wall due to friction between the sheet 14 and the lower inner wall surface 12L and the upper inner wall surface 12U. In this case, there may be a case in which only the magnet 13 is further inserted due to being further pressed. When this occurs, only the magnet 13 further moves while the sheet 14 has stopped moving, as a result of which a positional relationship between these members becomes displaced. As a result, a damage such as a clog (region R1) and a rip (region R2) occurs in the sheet 14.

In the art disclosed herein, the magnets 13 and the sheets 14 are inserted into the magnet holes 12 by pulling each of the sheets 14 fixed to the magnets 13 (S60). Instead of directly applying force onto the magnets 13, each pair of the magnet 13 and the sheet 14 can be ensured to be inserted integrally by applying the force to the magnet 13 via the sheet 14. The situation in which only the magnet 13 moves while the sheet 14 is in the state of having stopped moving does not occur, thus a positional relationship between them is not displaced. A damage to the sheets 14 does not occur.

(Second Effect)

As described in the magnet inserting step (S60), the gaps G1 can each be created by self-aligning positioning in the z direction using the force of gravity. Since positioning in the z direction does not have to be executed deliberately, a special mechanism for this positioning does not have to be provided. Cost reduction and improvement in maintenance efficiency in the rotor manufacturing device 1 can be achieved.

The gaps G1 will be described. In FIG. 9, an inner diameter of each magnet hole 12 in the z direction will be defined as ID. A thickness in the z direction of each magnet 13 covered by its corresponding sheet 14 will be defined as TT. The thickness TT is a sum of a value of a thickness T1 of the magnet 13 and a value that doubles a thickness T2 of the sheet 14. Since the positions of the lower surface 14L and the lower inner wall surface 12L in the z direction match by self-alignment, a value of each gap G1 becomes a difference between the inner diameter ID and the thickness T. That is, each of the gaps G1 can be set to a largest value that can theoretically be obtained. As such, a gap margin value for enabling smooth insertion in the magnet inserting step can be set extremely small. A gap between the inner wall of each magnet hole 12 and its corresponding magnet 13 can be set small, close to a design limit value. A performance of the motor can be improved without increasing difficulty in manufacturing the motor.

While specific examples of the present invention have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

(Variants)

In the present embodiment, a case in which the central axis CA of each magnet hole 12 is orthogonal to the vertical direction (−z direction) has been described, however, no limitation is made to this configuration. So long as the central axis CA is angled with respect to the vertical direction, the self-aligning positioning in the z direction by the force of gravity is possible. As such, an angle formed between the central axis CA and the vertical direction can freely be set.

Figure 12:
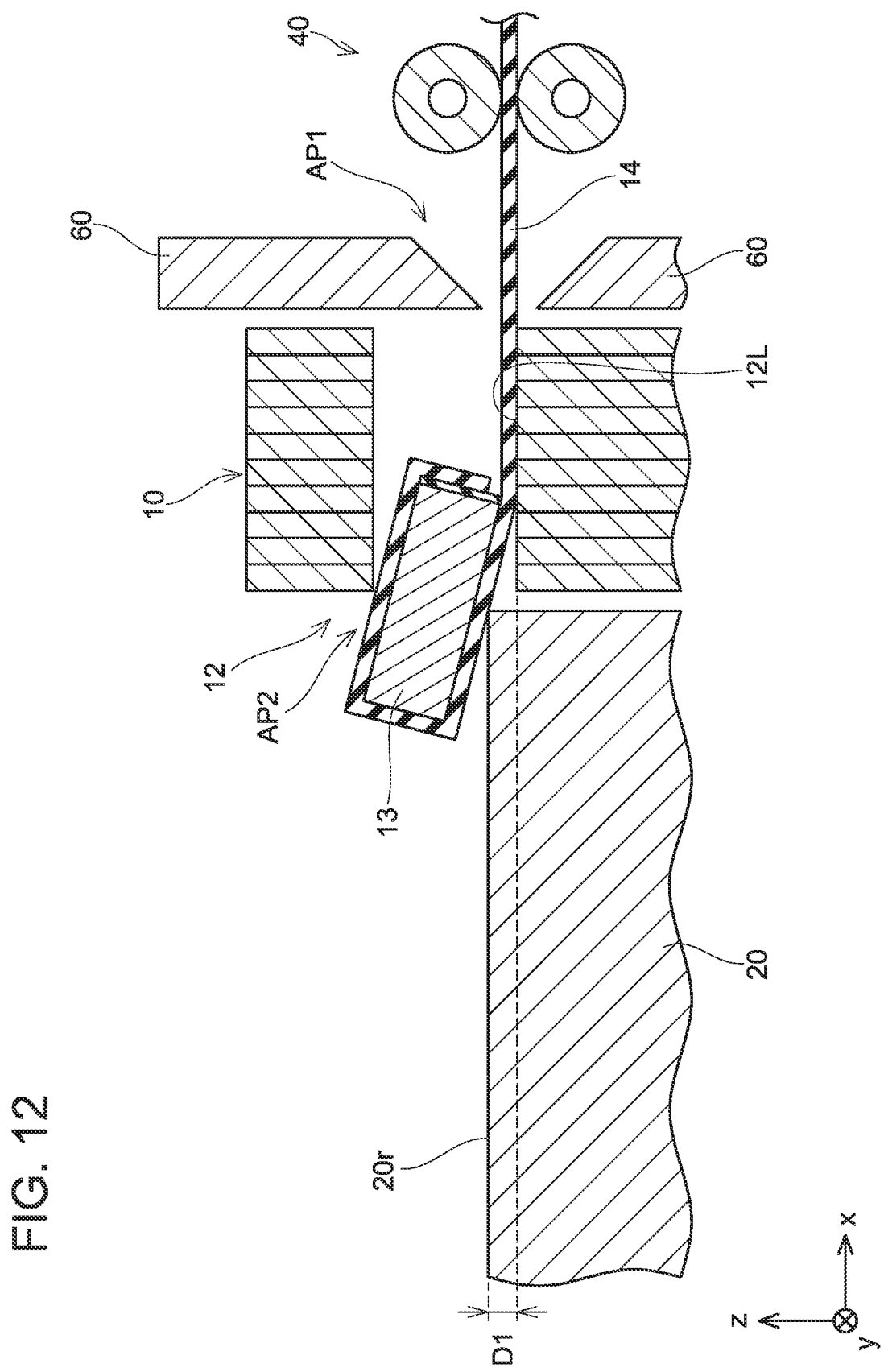
FIG. 12 shows a variant of a magnet inserting step.

In the present embodiment, a case in which the lower inner wall surface 12L and the reference surface 20r are located on the same plane has been described, however, no limitation is made to this configuration. As shown in FIG. 12, a displacement amount D1 may be present in the z direction so that the lower inner wall surface 12L becomes lower than the reference surface 20r. In this case as well, a state in which each sheet 14 is pressed against its corresponding lower inner wall surface 12L by the force of gravity can be maintained. Thus as shown in FIG. 12, due to the self-aligning positioning in the z direction being possible, the positioning in the z direction does not have to be executed deliberately. The self-aligning positioning in the z direction is similarly possible also in a case where the lower inner wall surface 12L is displaced along the z direction so as to be higher than the reference surface 20r.

Figure 13:
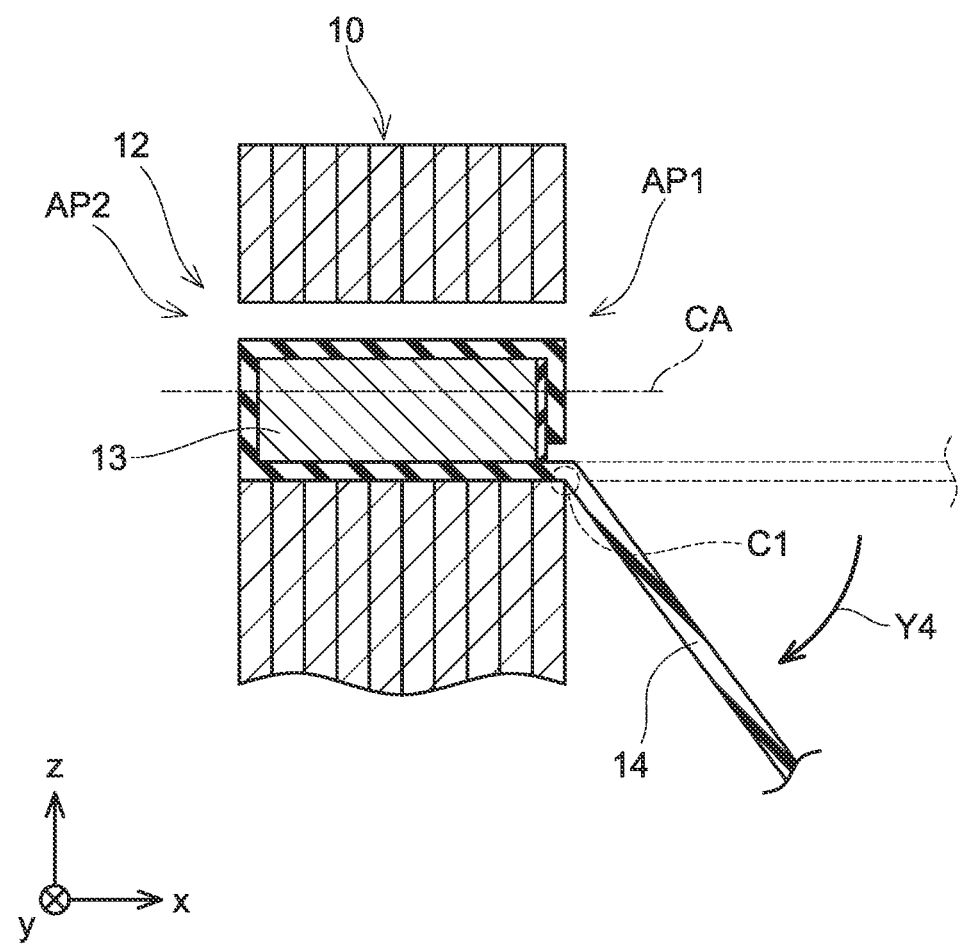
FIG. 13 shows a variant of a cutter.

A case in which the cutting step (S70) is executed by the cutter 60 has been described, however, no limitation is made to this configuration. For example, the sheets 14 may be cut using laser. Further, for example as shown in FIG. 13, the sheet 14 extending out from the first opening AP1 may be moved downward by a cutting tool that is not shown (arrow Y4). When the sheet 14 is pressed against a corner C1 of the first opening AP1, the corner C1 functions as a cutter and the sheet 14 can thereby be cut. Due to this, the cutter 60 may be omitted.

In the present embodiment, a case in which a position where each pair of the sheet 14 and the magnet hole 12 are fixed is the second side surface 13S2 (FIG. 7) has been described, however, no limitation is made to this configuration. Fixation simply needs to be done on at least one of the second side surface 13S2, the upper surface 131U, the first side surface 13S1, and the lower surface 13L. Further, the adhesive 54 may simply be applied on one of or both of the magnet 13 and the sheet 14.

Each of the sheets 14 simply needs to be configured to cover at least the upper surface 13U, the first side surface 13S1, and the lower surface 13L. Further, each sheet 14 may simply be configured to cover at least a part of one or more of the upper surface 13U, the first side surface 13S1, and the lower surface 13L.

In the present embodiment, a ease in which the insertion member is the sheet 14 has been described, however, no limitation is made to this configuration. The insertion member may be one of a sheet, a cord, a belt, and a band strip. The insertion member may have another shape.

The sheet moving mechanism 40 is not limited to the roller structures, and various other mechanisms may be used.

The step of setting the magnet 13 (S40) and the step of covering the magnet 13 with the sheet 14 (S50) are not limited to the above configuration of being executed using the robot 52, and may be executed manually.

In the sheet inserting step (S20), an inserting direction of the sheet 14 may be set freely. For example, the sheet roll 14r may be disposed on the second opening AP2 side and the sheet 14 may be inserted from the second opening AP2 side along the +x direction. In this case, a mechanism configured to cut the sheet 14 at the set position IP (FIG. 6) may be provided.

The magnet holes 12 are not limited to being rectangular in the plan view of FIG. 1, and may have various other shapes.

The sheets 14 are examples of the insertion member. The fixing shaft 30 is an example of a rotor core fixing unit. The sheet moving mechanism 40 is an example of an insertion member inserting unit and a magnet insertion unit. The fixed mechanism 50 is an example of a magnet fixation unit. The cutter 60 is an example of a cutting tool.

Some other features of the manufacturing method of the embodiment will be listed. The rotor core 10 is supported such that the central axes CA of the magnet holes 12 are angled with respect to the vertical direction. In the magnet inserting step, each sheet 14 (insertion member) guides the magnet 13 into the magnet hole 12 while being in contact with the lower surface 13L of the magnet 13 and the lower inner wall surface 12L of the magnet hole 12. The magnet 13 is pulled into the magnet hole 12 by the sheet 14 being pulled on the first opening AP1 side. Upon inserting the magnet 13, tensile force is generated in the sheet 14 at all times, as a result of which it is suppressed from being caught by the magnet hole 12.

In the fixing step, the processing stage 20 having the reference surface 20r being parallel to the lower inner wall surface 12L of the magnet hole 12 being processed is arranged adjacent to the magnet hole 12 (adjacent to the second opening AP2). The sheet 14 having passed through the magnet hole 12 is placed on the reference surface 20r, and the magnet 13 is placed on this sheet 14.

What is claimed is:

1. A method of manufacturing a rotor in which a magnet is inserted into a magnet hole of a rotor core, the method comprising:
    inserting an insertion member into the magnet hole having a first opening and a second opening;
    fixing the magnet to the insertion member extending out from the second opening;
    inserting the magnet, which is fixed to the insertion member, into the magnet hole from the second opening by pulling the insertion member extending out from the first opening in a direction separating away from the rotor core; and
    cutting the insertion member extending out from the first opening,
    wherein a central axis direction of the magnet hole is angled with respect to a vertical direction,
    the magnet hole includes two inner wall surfaces facing each other, one of which is a lower inner wall surface located on a lower side along the vertical direction,
    the inserting of the magnet is executed in a state of having a lower surface of the magnet in contact with the lower inner wall surface via the insertion member,
    the magnet has a shape of a substantially rectangular solid,
    the magnet includes the lower surface, an upper surface being a surface opposite to the lower surface, and a first side surface and a second side surface that are orthogonal to a central axis of the magnet hole,
        wherein a distance between the first side surface and the magnet hole is greater than a distance between the second side surface and the magnet hole, and
    in the fixing, the insertion member is fixed to the magnet so as to cover the upper surface, the first side surface, and the lower surface of the magnet.

2. The method according to claim 1, wherein
    a processing stage including a reference surface parallel to the lower inner wall surface is disposed in a vicinity of the second opening,
    in the inserting of the insertion member, a state in which the insertion member is in contact with the reference surface as well as with the lower inner wall surface is established,
    in the fixing, a state in which the lower surface of the magnet is in contact with the reference surface via the insertion member is established, and in the inserting of the magnet, the insertion member is pulled by maintaining the state in which the insertion member is in contact with the lower inner wall surface.

3. The method according to claim 1, wherein in the fixing, the insertion member is adhered to at least a part of one or more of the upper surface, the first side surface, and the lower surface by adhesive.

* * * * *